No. 823,749. PATENTED JUNE 19, 1906.
M. WANNER.
METHOD OF SIMULTANEOUSLY MINING AND WASHING CLAY, KAOLIN, &c.
APPLICATION FILED MAR. 28, 1905.
2 SHEETS—SHEET 2.
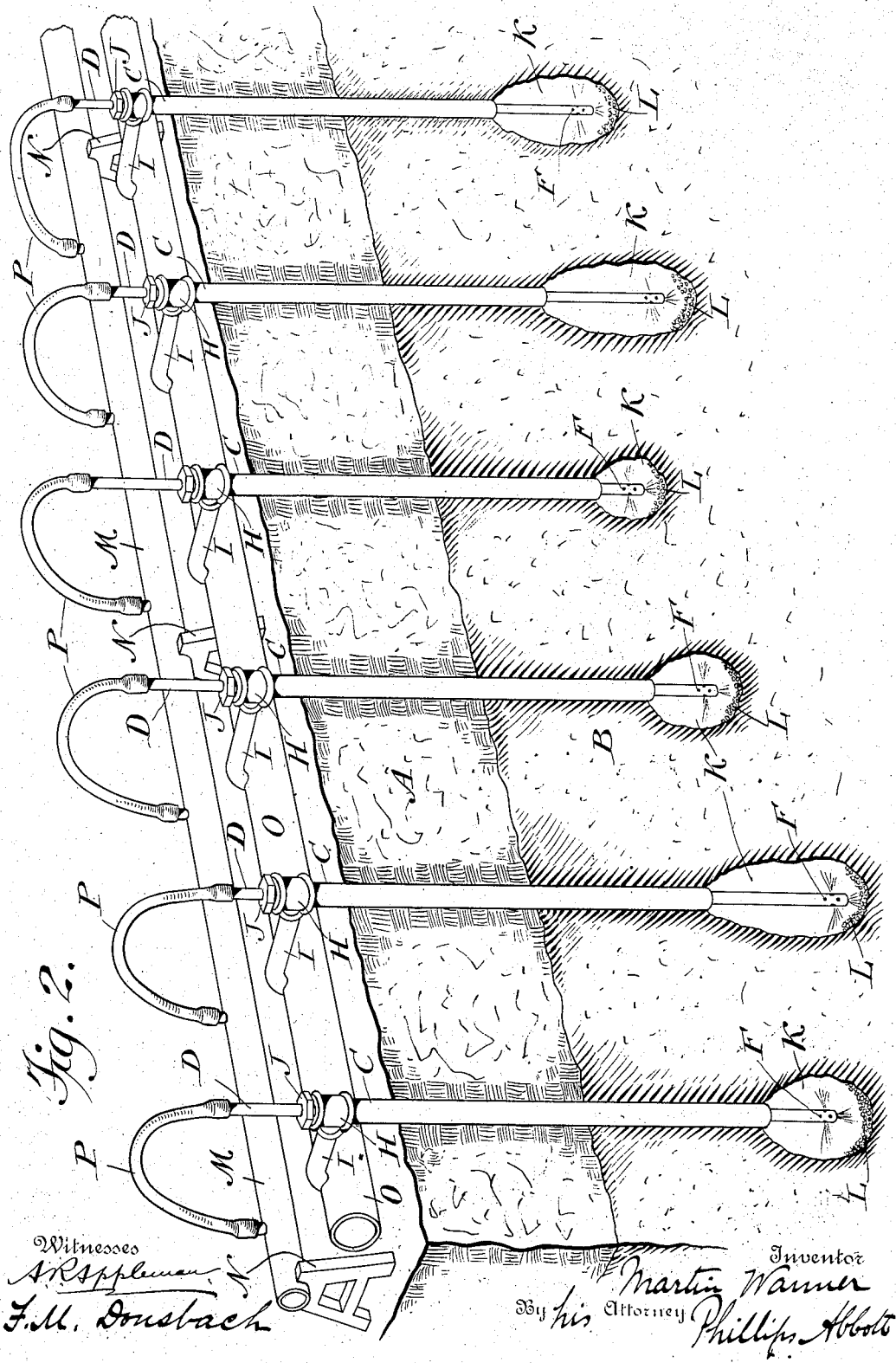

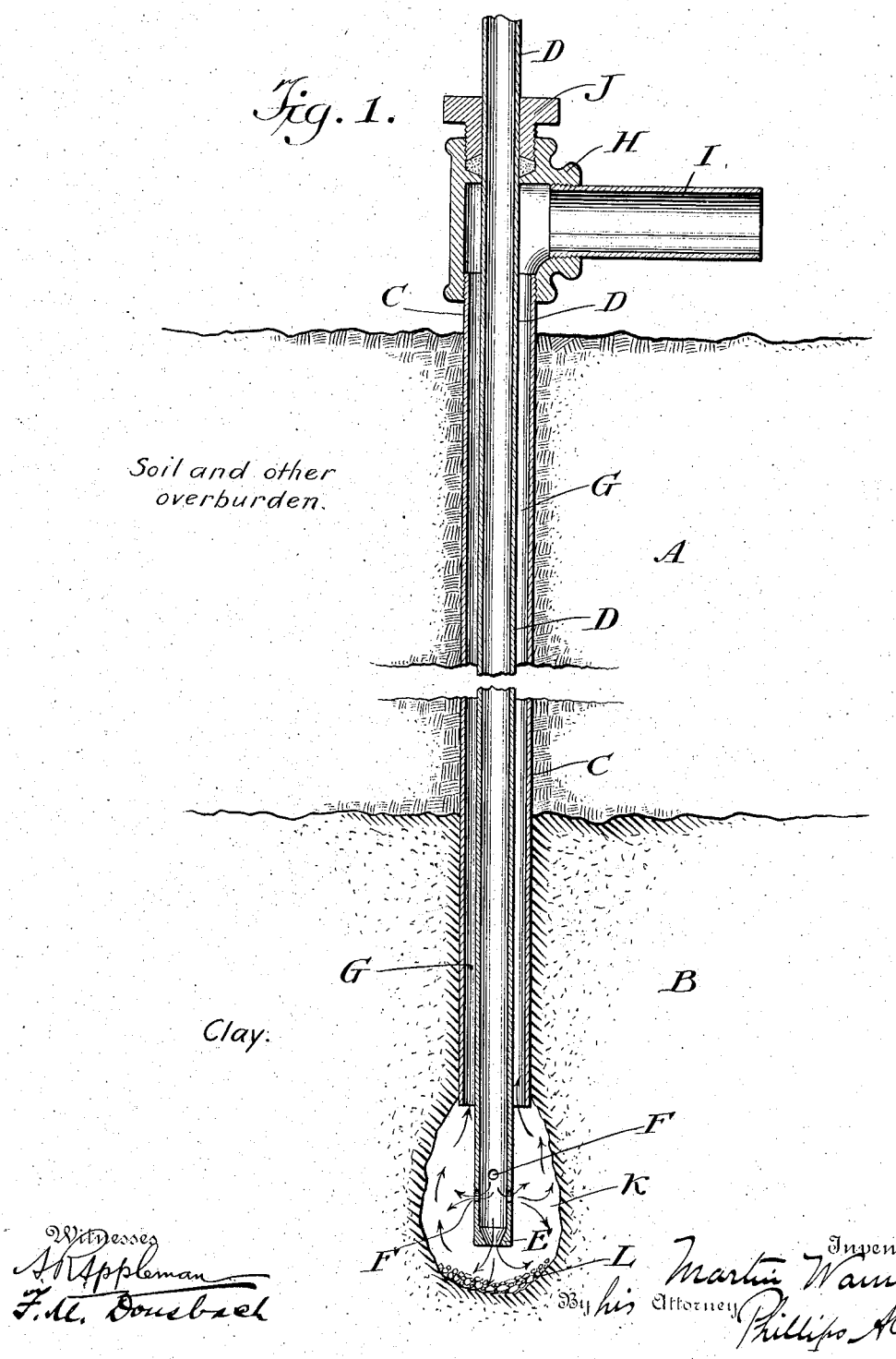

UNITED STATES PATENT OFFICE.

MARTIN WANNER, OF NEW YORK, N. Y., ASSIGNOR OF ONE-HALF TO THOMAS SKELTON HARRISON, OF PHILADELPHIA, PENNSYLVANIA.

METHOD OF SIMULTANEOUSLY MINING AND WASHING CLAY, KAOLIN, &c.

No. 823,749.     Specification of Letters Patent.     Patented June 19, 1906.

Application filed March 28, 1905. Serial No. 252,548.

*To all whom it may concern:*

Be it known that I, MARTIN WANNER, a citizen of the United States, and a resident of the borough of Brooklyn, county of Kings, city and State of New York, have invented a new and useful Method of Simultaneously Mining and Washing Clay, Kaolin, and other Analogous Deposits, of which the following is a specification, reference being had to the accompanying drawings, in which—

Figure 1 illustrates a vertical sectional view of one form of apparatus whereby my process may be practiced. Fig. 2 illustrates a perspective vertical sectional view showing a gang of apparatus similar to that illustrated in Fig. 1 arranged in series.

My improved method, generally stated, consists in driving a suitable pipe through the surface strata forming the "overburden" into the clay, kaolin, or similar deposit the desired distance, and within this exterior tube or pipe, through a suitable stuffing-box placed at its upper end, there is inserted another pipe the exterior diameter of which is considerably smaller than the interior diameter of the outer pipe, so that there is a considerable space between the two for water passage, and this interior pipe is connected at the top with a water-supply pipe and has a suitable nozzle or jet-producing device at its lower end.

In operation the water is forced under requisite pressure downwardly through the interior pipe and is forcibly ejected from its lower end, which, as stated, lies within the clay or kaolin strata, disintegrating it and washing therefrom all fine material, the particles of which are held in suspension in the water and carried by it in the upward rush of the current through the space or waterway between the two pipes, and upon reaching the top it passes through a suitable spout and is discharged into a conduit, by which it is conveyed to a suitable settling tank or tanks, in which the fine clay or kaolin freed from all quartz, unaltered feldspar, and other residual matter will speedily settle or precipitate, or instead of employing settling-tanks the charged water may be forced directly through filter-presses, according to practices now well known.

Referring now to the drawings, in Fig. 1, A represents the superimposed body or strata of the upper soil or "overburden," so called; B, the kaolin or clay strata; C, the exterior pipe; D, the interior pipe; E, the nozzle on the end of the interior pipe; F, perforations therein near the end, which may be employed, if desired, to divide the water column into a series of separated jets; G, the water-space between the two pipes; H, a coupling whereby a discharge-spout I may be conveniently connected, and J the stuffing-box. In this figure I do not show the water-supply pipe nor the conduit for conveying the clay-charged water to the settling-tank or filter-press. In this figure also a cavity K is shown as having been already made in the kaolin bed, and at the bottom of this cavity at L are shown the particles of quartz, unaltered feldspar, and other granular matter which has been washed out or separated from the fine kaolin or clay and which owing to its relatively greater specific gravity has settled to the bottom of the cavity, whereas the fine impalpable matter of less specific gravity has been elevated in the upwardly-flowing current and discharged, as above stated.

It is a well-known physical fact that clay or kaolin beds are, as may be stated, automatically fluent—that is to say, if a cavity be made therein and there be any considerable superimposed weight the kaolin or clay will itself move or flow from all sides toward substantially the center of the cavity, tending to fill the same. Therefore when in the operation of my apparatus and the practice of my process a cavity of any considerable area has been formed the surrounding kaolin or clay will by itself move inwardly, thus continuously supplying material for a continuance of the operation, and in order that I may enlarge the cavity, if necessary, to induce such flowing I so construct the stuffing-box that the interior pipe D may be dropped downwardly through it as desired, so as to increase the size of the cavity. Indeed, I prefer to so adjust the pressure of the stuffing-box against the interior pipe that it will automatically of its own weight adjust itself by sliding spontaneously through the stuffing-box as the resistance below permits.

My process may be practiced by the use of a single apparatus such as disclosed in Fig. 1; but I prefer to arrange a series of them, as it were, in multiple, as illustrated in Fig. 2, in which the parts of the individual apparatus are or may be the same as heretofore described in connection with Fig. 1, in addition to which I illustrate the following parts.

M is a main water-supply pipe, which, of course, is suitably connected with a proper force-pump.

N represents or may represent horses or other suitable supports for the pipe M.

O is the discharge-pipe which connects with the several spouts, whereby the clay or kaolin bearing water is conveyed to the settling-tanks or filter-presses, as the case may be.

P represents or may represent sections of flexible pipe, such as hose, connecting with nipples on the water-supply pipe and with the upper ends of the injection-pipes D, so that the latter may have requisite movement through the exterior pipes for the purpose described.

In some of the apparatus shown in Fig. 2 I illustrate the pipes D as being near their upper position and in others at a lower position. In this figure also I show six only of the apparatus ganged together. In practice the number may be indefinitely extended, as the nature or area of the deposit may require. When a series of apparatus is arranged in gangs—i. e., in multiple, as illustrated in Fig. 2 large quantities of kaolin or clay may be mined and washed very inexpensively and satisfactorily.

It will be noted that when my process is practiced with the apparatus arranged in multiple they should be placed sufficiently near together, so that the excavations formed will be such as to practically exhaust the clay or kaolin strata at the place where they are located—in other words, so that the flowage of the clay or kaolin to fill the cavities shall be practically uniform in order that there shall be a gradual subsidence of the overburden without breaking up the clay or kaolin strata into fissures or holes, through which some of the upper soil or overburden might pass downwardly thereto, which might result in the mingling of the overburden therewith, thus adulterating or degrading the quality of the product. It will be noted also that my process and the apparatus whereby I practice it are essentially different from that used in the extraction of salt from a subterranean salt bed wherein water is allowed to pass to the salt strata and after becoming impregnated or saturated therewith is pumped out again, because under my process the water must be injected under pressure and with sufficient force to not only disintegrate and break down the walls of the kaolin or clay bed, but also to finely disintegrate the kaolin or clay itself, whereby the finer particles will be caught by the uprushing current, leaving all coarser particles or impurities behind. Consequently the force of the water-current should be regulated in my process so as to effect the stated disintegration, separation, and elevation. In salt-mining also the process relies upon the solution of the salt by the water, whereas in my process there is no solution whatever, but simply a mechanical disintegration of the deposit and a mechanical carrying of the clay or kaolin particles by the water.

I call particular attention to the fact that under my process I effect the following marked advantages not heretofore realized in the mining of subterranean clay deposits, so far as I am informed—i. e., the great expense and labor necessary for the removal of perhaps a heavy deposit of overburden are entirely avoided. The thickness of the overburden is of no consequence in the practice of my process, because it may be carried on with equal effectiveness whether the overburden be of slight thickness only or of great thickness, even one hundred feet or more. Of course the labor and expense of driving the exterior conduit-pipes slightly increases as the thickness of the overburden increases; but this is a matter of trivial consequence. Indeed, the greater the weight of the overburden within certain limits the more satisfactorily my process operates, because of the greater weight tending to more immediate and satisfactory flowing of the underlying clay or kaolin deposit. Again, the labor account is reduced to a ridiculous minimum as compared with the same account under present practices. Pratically all that is necessary is a single engineer to run the pumps for works of an indefinite capacity. All the rest of the operation is practically automatic. Again, all labor and expense of washing or otherwise effecting the separation of the fine kaolin or clay material from its impurities (quartz, unaltered feldspar, &c. are avoided.) Again, the several operations of mining, washing, or separating and elevating may all be effected as a continuous operation without any intervening handling or without any additional apparatus other than the exceedingly simple apparatus described, which effects all three of these operations. Lastly, that which is a matter of consequence in many neighborhoods, owing to the prejudice that owners of clay beds frequently have to a defacement of the surface, because of the inevitable decrease of value in the adjoining properties, is obviated by the practice of my process, for it does not produce any unsightly superficial excavations, piles of debris, and other defacements, and I also require no dumping-ground whatever. The gradual subsidence of the surface as the clay or kaolin deposit is exhausted results merely in change of surface elevation, usually without seriously interfering with surface growths or materially altering surface contours.

Obviously modifications may be made in the details of the apparatus above described by me without departing from the essentials of the method. I therefore do not limit myself to such details.

I claim—

1. The process of mining clay and similar subterranean deposits consisting in disintegrating the deposit by means of water under pressure carried through the overburden and projected against the deposit, maintaining sufficient water-pressure in the cavity thus formed in the deposit to regulate the subsidence of the overburden and to convey the finer particles of the disintegrated material to the surface by the return-flow of the water in its escape from said cavity, and continuously conveying the same thence for further manipulation.

2. The process of mining clay and similar subterranean deposits consisting in disintegrating the deposit by means of water carried through the overburden and projected against the deposit under such pressure as will disintegrate it and maintain sufficient pressure in the cavity formed in the deposit to regulate the subsidence of the overburden and convey the finer particles of the disintegrated material to the surface by the return-flow of the water, leaving the coarser material within the cavity of the excavation.

3. The process of mining clay and similar subterranean deposits consisting in breaking up the deposit by means of water carried through the overburden and projected against the deposit under sufficient pressure to disintegrate it and maintain pressure in the cavity formed in the deposit adequate to regulate the subsidence of the overburden and to convey the finer particles of the disintegrated material to the surface by the return-flow of the water, leaving the coarser material within the cavity of the excavation and continuously conveying the fine removed material away for further manipulation.

4. The process of mining clay and similar subterranean deposits consisting in disintegrating the deposit by means of a series of water columns under pressure carried through the overburden and projected against the deposit, maintaining sufficient water-pressure in the cavity thus formed in the deposit to regulate the subsidence of the overburden and to convey the finer particles of the material disintegrated by each water column to the surface by the return-flow of the water of that column in its escape from said cavity and conveying the same thence for further manipulation.

5. The process of mining clay and similar subterranean deposits consisting in disintegrating the deposit by means of a series of water columns under pressure carried through the overburden and projected against the deposit maintaining water-pressure in the cavity formed in the deposit, conveying the fine material disintegrated by the water columns to the surface by the return-flow of the water in its escape from said cavity, the several water columns being so located relative to each other that the series of excavations made by them in the deposit will be of such area and so located as to permit uniform subsidence of the superposed deposit without producing material rupture of or fissures in it.

6. The process of mining clay and similar subterranean deposits consisting in disintegrating the deposit by means of a series of water columns under pressure carried through the overburden and projected against the deposit maintaining water-pressure in the cavity formed in the deposit, the pressure being so regulated as that the return-flow of the water in its escape from said cavity will elevate to the surface the fine disintegrated material, leaving the coarser material within the excavations, the water columns being so located relative to each other that the series of excavations made by them in the deposit will be of such area and so located as to permit uniform subsidence of the superposed deposit without producing material rupture of or fissures in it.

7. The process of mining clay and similar subterranean deposits consisting in disintegrating the deposit by means of water under pressure carried through the overburden and projected against the deposit, maintaining sufficient water-pressure in the cavity thus formed in the deposit to regulate the subsidence of the overburden and to convey the finer particles of the disintegrated material to the surface by the return-flow of the water in its escape from said cavity, and adjusting the point of projection of the water under pressure against the walls of the excavation as it gradually enlarges.

In testimony whereof I have signed my name to this specification in the presence of two subscribing witnesses.

MARTIN WANNER.

Witnesses:
F. M. DONSBACH,
E. CUNNINGHAM.